(12) United States Patent
Li et al.

(10) Patent No.: US 11,775,574 B2
(45) Date of Patent: Oct. 3, 2023

(54) METHOD AND APPARATUS FOR VISUAL QUESTION ANSWERING, COMPUTER DEVICE AND MEDIUM

(71) Applicant: Beijing Baidu Netcom Science Technology Co., Ltd., Beijing (CN)

(72) Inventors: Yulin Li, Beijing (CN); Xiameng Qin, Beijing (CN); Ju Huang, Beijing (CN); Qunyi Xie, Beijing (CN); Junyu Han, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 297 days.

(21) Appl. No.: 17/182,987

(22) Filed: Feb. 23, 2021

(65) Prior Publication Data

US 2021/0406592 A1 Dec. 30, 2021

(30) Foreign Application Priority Data

Jun. 30, 2020 (CN) .......................... 202010616310.1

(51) Int. Cl.
*G06F 16/00* (2019.01)
*G06F 16/36* (2019.01)
(Continued)

(52) U.S. Cl.
CPC .......... *G06F 16/367* (2019.01); *G06F 18/253* (2023.01); *G06F 40/279* (2020.01);
(Continued)

(58) Field of Classification Search
CPC .... G06K 9/629; G06K 9/6293; G06K 9/6215; G06F 40/279; G06F 40/205; G06F 40/35;
(Continued)

(56) References Cited

U.S. PATENT DOCUMENTS

2019/0370587 A1* 12/2019 Burachas ............... G06T 11/60
2021/0248375 A1*  8/2021 Geng ................... G06F 18/2113

FOREIGN PATENT DOCUMENTS

EP          3166049              5/2017

OTHER PUBLICATIONS

Guo et al, Bilinear Graph Networks for Visual Question Answering, arXiv:1907.09815 (Year: 2020).*
Peng et al, Cra-net: Composed relation attention network for visualquestion answering, MM '19: Proceedings of the 27th ACM Inter national Conference on Multimedia, Oct. 2019, pp. 1202-1210 (Year: 2019).*
Yang et al, Relationship-Embedded Representation Learning for Grounding Referring Expressions, arXiv:1906.04464v3 Apr. 19, 2020.*

(Continued)

*Primary Examiner* — Nay A Maung
*Assistant Examiner* — Xiao Liu
(74) *Attorney, Agent, or Firm* — Hamre, Schumann, Mueller & Larson, P.C.

(57) ABSTRACT

A method for visual question answering, a computer device implementing the method and a medium for storing instructions on performing the method are provided. The method includes: acquiring an input image and an input question; constructing a visual graph based on the input image, wherein the visual graph comprises a first node feature and a first edge feature; constructing a question graph based on the input question, wherein the question graph comprises a second node feature and a second edge feature; performing a multimodal fusion on the visual graph and the question graph to obtain an updated visual graph and an updated question graph; determining a question feature based on the input question; determining a fusion feature based on the updated visual graph, the updated question graph and the question feature; and generating a predicted answer for the input image and the input question.

16 Claims, 8 Drawing Sheets

Figure 1:
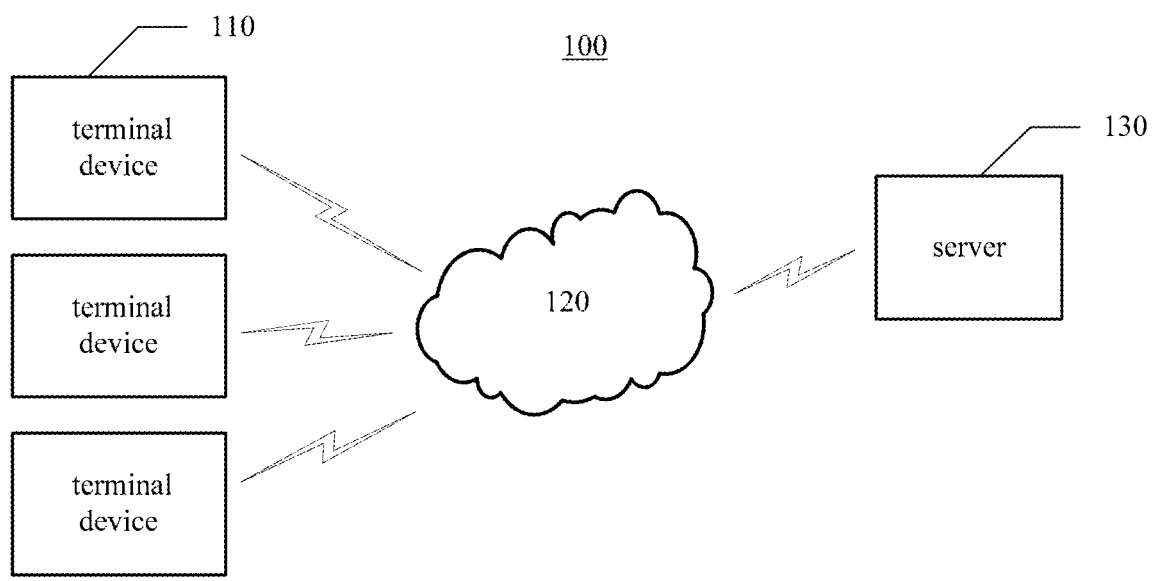

(51) Int. Cl.
- *G06F 40/279* (2020.01)
- *G06F 18/25* (2023.01)
- *G06V 10/764* (2022.01)
- *G06V 10/80* (2022.01)
- *G06V 10/82* (2022.01)
- *G06V 10/44* (2022.01)
- *G06V 10/426* (2022.01)
- *G06N 3/02* (2006.01)

(52) U.S. Cl.
CPC .......... *G06V 10/426* (2022.01); *G06V 10/454* (2022.01); *G06V 10/764* (2022.01); *G06V 10/811* (2022.01); *G06V 10/82* (2022.01); *G06N 3/02* (2013.01)

(58) Field of Classification Search
CPC ...... G06F 16/583; G06F 16/532; G06F 40/30; G06F 16/367; G06V 10/40; G06V 10/426; G06V 10/454; G06V 10/764; G06V 10/811; G06V 10/82; G06V 20/00; G06N 3/02; G06N 3/0454; G06N 3/08; G06N 5/045
See application file for complete search history.

(56) References Cited

OTHER PUBLICATIONS

Teney et al, Graph-Structured Representations for Visual Question Answering, 2017 IEEE Conference on Computer Vision and Pattern Recognition (CVPR), pp. 3233-3241 (Year: 2017).*

Teney et al., "Graph-Structured Representations for Visual Question Answering", Computer Science, Sep. 19, 2016, 17 pages, available at https://arxiv.org/abs/1609.05600.

Li et al., "Relation-Aware Graph Attention Network for Visual Question Answering", 2019 IEEE/CVF International Conference on Computer Vision (ICCV), Oct . 27-Nov. 2, 2019, 13 pages, available at https://ieeexplore.ieee.org/document/9010056.

Li Linjie et al., "Relation-Aware Graph Attention Network for Visual Question Answering", 2019 IEEE/CVF International Conference on Computer Vision (ICCV), IEEE, Oct. 27, 2019, pp. 10312-10321.

Wenwu Zhu et al., "Multi-modal Deep Analysis for Multimedia", IEEE Transactions on Circuits and Systems for Video Technology, arxiv.org, Cornell University Library, Oct. 11, 2019, 25 pages.

Mingrui Lao et al., "Cross-Modal Multistep Fusion Network With Co-Attention for Visual Question Answering", IEEE Access, vol. 6, No. 7, Mar. 30, 2018, pp. 31516-31524.

The extended European Search Report, issued in the corresponding European patent application No. 21159579.8, dated Jul. 8, 2021, 13 pages.

* cited by examiner

METHOD AND APPARATUS FOR VISUAL QUESTION ANSWERING, COMPUTER DEVICE AND MEDIUM

CROSS-REFERENCE TO RELATED APPLICATION(S)

This application claims priority to the Chinese Patent Application No. 202010616310.1, filed on Jun. 30, 2020, which is incorporated herein by reference in its entirety.

TECHNICAL FIELD

The present disclosure relates to fields of computer vision and natural language processing, and more specifically, to a method and apparatus for visual question answering, a computer device and a medium.

BACKGROUND

Visual question answering (VQA) is a challenging task, and a goal of visual question answering is to connect computer vision with natural language processing. In a task of visual question answering, for example, given an image and a question related to the image, a machine is required to infer an answer for the question according to image content and some common sense. In order to complete the task of visual question answering, the machine is ensured to have an ability of cross-modal understanding, to realize a comprehensive understanding of data under two different modalities of vision and language. Therefore, the task of visual question answering has more requirements compared with other single modality tasks (such as image identification, document classification, etc.).

SUMMARY

In view of this, the present disclosure provides a method and apparatus for visual question answering, a computer device and a medium.

One aspect of the present disclosure provides a method for visual question answering, comprising: acquiring an input image and an input question; constructing a visual graph based on the input image, wherein the visual graph comprises a first node feature and a first edge feature; constructing a question graph based on the input question, wherein the question graph comprises a second node feature and a second edge feature; performing a multimodal fusion on the visual graph and the question graph to obtain an updated visual graph and an updated question graph; determining a question feature based on the input question; determining a fusion feature based on the updated visual graph, the updated question graph and the question feature; and generating a predicted answer for the input image and the input question based on the fusion feature.

According to an embodiment of the present disclosure, the constructing the visual graph based on the input image comprises: processing the input image by using an object detection network to extract an appearance feature and a spatial feature of a plurality of target objects in the input image from a middle layer of the object detection network; determining the first node feature based on the appearance feature and the spatial feature; determining position information of each of the plurality of target objects respectively, based on a processing result output by an output layer of the object detection network; determining a position relationship between any two of the plurality of target objects based on the position information of each of the plurality of target objects; determining the first edge feature based on the position relationship between the any two target objects; and constructing the visual graph by using the first node feature and the first edge feature.

According to an embodiment of the present disclosure, the determining the position relationship between any two of the plurality of target objects respectively, based on the position information of each of the plurality of target objects comprises: calculating an intersection of position regions of the any two target objects and a union of the position regions of the any two target objects according to position information of each of the any two target objects; calculating a ratio between the intersection and the union; indicating the position relationship between the any two target objects as 1, in response to the ratio being greater than a predetermined threshold; and indicating the position relationship between the any two target objects as 0, in response to the ratio being less than or equal to the predetermined threshold.

According to an embodiment of the present disclosure, the constructing the question graph based on the input question comprises: processing the input question successively by using a word embedding algorithm and a feature embedding algorithm to extract a plurality of word node features from the input question, wherein the plurality of word node features are used to indicate feature information of each of a plurality of words in the input question; determining a dependency relationship between any two of the plurality of words by using a dependency parsing algorithm; determining the second edge feature based on the dependency relationship between the any two words; and constructing the second node feature by using the plurality of word node features, and constructing the question graph by using the second node feature and the second edge feature.

According to an embodiment of the present disclosure, the performing the multimodal fusion on the visual graph and the question graph comprises: performing at least one round of multimodal fusion operation. Wherein each of the at least one round of multimodal fusion operation comprises: encoding the first node feature by using a first predetermined network based on the first node feature and the first edge feature, to obtain an encoded visual graph; encoding the second node feature by using a second predetermined network based on the second node feature and the second edge feature, to obtain an encoded question graph; and performing a multimodal fusion on the encoded visual graph and the encoded question graph by using a graph match algorithm, to obtain the updated visual graph and the updated question graph.

According to an embodiment of the present disclosure, the first predetermined network comprises: a first fully connected layer, a first graph convolutional layer and a second graph convolutional layer. The encoding the first node feature comprises: mapping the first node feature to a first feature by using the first fully connected layer, wherein a number of spatial dimensions of the first feature equals to a predetermined number; processing the first feature by using the first graph convolutional layer to obtain a second feature; processing the second feature by using the second graph convolutional layer to obtain the encoded first node feature; and constructing the encoded visual graph by using the encoded first node feature and the first edge feature.

According to an embodiment of the present disclosure, the encoding the first node feature further comprises: constructing a first Graph Laplacians based on the first edge feature. The processing the first feature by using the first graph convolutional layer comprises: processing the first feature by using the first graph convolutional layer based on the first Graph Laplacians to obtain the second feature, wherein the second feature comprises a plurality of first sub-features.

According to an embodiment of the present disclosure, the first predetermined network further comprises a first association layer. The encoding the first node feature further comprises: calculating an association relationship between any two of the plurality of first sub-features by using the first association layer, and determining a first relationship matrix based on the association relationship between the any two first sub-features. The processing the second feature by using the second graph convolutional layer comprises: processing the second feature by using the second graph convolutional layer based on the first relationship matrix to obtain the encoded first node feature.

According to an embodiment of the present disclosure, the second predetermined network comprises: a second fully connected layer, a third graph convolutional layer and a fourth graph convolutional layer. The encoding the second node feature comprises: mapping the second node feature to a third feature by using the second fully connected layer, wherein a number of spatial dimensions of the third feature equals to a predetermined number; processing the third feature by using the third graph convolutional layer to obtain a fourth feature; processing the fourth feature by using the fourth graph convolutional layer to obtain the encoded second node feature; and constructing the encoded question graph by using the encoded second node feature and the second edge feature.

According to an embodiment of the present disclosure, the encoding the second node feature further comprises: constructing a second Graph Laplacians based on the second edge feature. The processing the third feature by using the third graph convolutional layer comprises: processing the third feature by using the third graph convolutional layer based on the second Graph Laplacians to obtain the fourth feature, wherein the fourth feature comprises a plurality of second sub-features.

According to an embodiment of the present disclosure, the second predetermined network further comprises a second association layer. The encoding the second node feature further comprises: calculating an association relationship between any two of the plurality of second sub-features by using the second association layer, and determining a second relationship matrix based on the association relationship between the any two second sub-features. The processing the fourth feature by using the fourth graph convolutional layer comprises: processing the fourth feature by using the fourth graph convolutional layer based on the second relationship matrix to obtain the encoded second node feature.

According to an embodiment of the present disclosure, the encoded first node feature in the encoded visual graph comprises a plurality of third sub-features, and the encoded second node feature in the encoded question graph comprises a plurality of fourth sub-features. The performing the multimodal fusion on the encoded visual graph and the encoded question graph by using the graph match algorithm comprises: matching the encoded first node feature and the encoded second node feature by using the graph match algorithm, to determine a matching relationship between any one of the plurality of third sub-features and any one of the plurality of fourth sub-features; determining a matching matrix based on the matching relationship between the any third sub-feature and the any fourth sub-feature; determining a first attention weight set and a second attention weight set respectively based on an attention mechanism and the matching matrix; determining an updated second node feature based on the first attention weight set, the encoded first node feature and the encoded second node feature; determining an updated first node feature based on the second attention weight set, the encoded first node feature and the encoded second node feature; and constructing the updated visual graph by using the updated first node feature and the updated first edge feature, and constructing the updated question graph by using the updated second node feature and the updated second edge feature.

According to an embodiment of the present disclosure, the determining the question feature based on the input question comprises: encoding the input question successively by using a predetermined word embedding algorithm and a predetermined feature embedding algorithm to obtain the question feature.

According to an embodiment of the present disclosure, the determining the fusion feature based on the updated visual graph, the updated question graph and the question feature comprising: performing a concatenate mergence on the updated first node feature and the updated second node feature to obtain a merged feature; performing a predetermined pooling operation on the merged feature to obtain a reasoning feature; and fusing the reasoning feature and the question feature to obtain the fused feature.

According to an embodiment of the present disclosure, the fusing the reasoning feature and the question feature comprises: performing an element-wise dot product operation on the reasoning feature and the question feature to obtain the fusion feature.

According to an embodiment of the present disclosure, the generating the predicted answer for the input image and the input question based on the fusion feature comprises: processing the fusion feature by using a multi-layer perceptron to obtain the predicted answer for the fusion feature.

Another aspect of the present disclosure provides an apparatus for visual question answering, comprising: an acquiring module, a first graph constructing module, a second graph constructing module, an updating module, a question feature extracting module, a fusing module and a predicting module. The acquiring module is configured to acquire an input image and an input question. The first graph constructing module is configured to construct a visual graph based on the input image, wherein the visual graph comprises a first node feature and a first edge feature. The second graph constructing module is configured to construct a question graph based on the input question, wherein the question graph comprises a second node feature and a second edge feature. The updating module is configured to perform a multimodal fusion on the visual graph and the question graph to obtain an updated visual graph and an updated question graph. The question feature extracting module is configured to determine a question feature based on the input question. The fusing module is configured to determine a fusion feature based on the updated visual graph, the updated question graph and the question feature. The predicting module is configured to generate a predicted answer for the input image and the input question based on the fusion feature.

According to an embodiment of the present disclosure, the first graph constructing module comprises: a detecting sub-module, configured to process the input image by using an object detection network to extract an appearance feature and a spatial feature of a plurality of target objects in the input image from a middle layer of the object detection network; a first node feature determining sub-module, configured to determine the first node feature based on the appearance feature and the spatial feature; a first edge feature determining sub-module, configured to determine position information of each of the plurality of target objects respectively, based on a processing result output by an output layer of the object detection network, determine a position relationship between any two of the plurality of target objects based on the position information of each of the plurality of target objects, and determine the first edge feature based on the position relationship between the any two target objects; and a first graph constructing sub-module, configured to construct the visual graph by using the first node feature and the first edge feature.

According to an embodiment of the present disclosure, the first edge feature determining sub-module determining the position relationship between any two of the plurality of target objects respectively, based on the position information of each of the plurality of target objects comprises: the first edge feature determining sub-module configured to calculate an intersection of position regions of the any two target objects and a union of the position regions of the any two target objects according to position information of each of the any two target objects; calculate a ratio between the intersection and the union; indicate the position relationship between the any two target objects as 1, in response to the ratio being greater than a predetermined threshold; and indicate the position relationship between the any two target objects as 0, in response to the ratio being less than or equal to the predetermined threshold.

According to an embodiment of the present disclosure, the second graph constructing module comprises: a second node feature determining sub-module, configured to process the input question successively by using a word embedding algorithm and a feature embedding algorithm to extract a plurality of word node features from the input question, wherein the plurality of word node features are used to indicate feature information of each of a plurality of words in the input question; a second edge feature determining sub-module, configured to determine a dependency relationship between any two of the plurality of words by using a dependency parsing algorithm, and determine the second edge feature based on the dependency relationship between the any two words; and a second graph constructing sub-module, configured to construct the second node feature by using the plurality of word node features, and construct the question graph by using the second node feature and the second edge feature.

According to an embodiment of the present disclosure, the updating module is configured to perform at least one round of multimodal fusion operation on the visual graph and the question graph. Wherein, the updating module performing each of the at least one round of multimodal fusion operation comprises: a first graph encoding sub-module, configured to encode the first node feature by using a first predetermined network based on the first node feature and the first edge feature, to obtain an encoded visual graph; a second graph encoding sub-module, configured to encode the second node feature by using a second predetermined network based on the second node feature and the second edge feature, to obtain an encoded question graph; and a graph matching sub-module, configured to perform a multimodal fusion on the encoded visual graph and the encoded question graph by using a graph match algorithm, to obtain the updated visual graph and the updated question graph.

According to an embodiment of the present disclosure, the first predetermined network comprises: a first fully connected layer, a first graph convolutional layer and a second graph convolutional layer. The first graph encoding sub-module comprises: a first mapping unit, configured to map the first node feature to a first feature by using the first fully connected layer, wherein a number of spatial dimensions of the first feature equals to a predetermined number; a first graph convolutional unit, configured to process the first feature by using the first graph convolutional layer to obtain a second feature; a second graph convolutional unit, configured to process the second feature by using the second graph convolutional layer to obtain the encoded first node feature; and a first encoding unit, configured to construct the encoded visual graph by using the encoded first node feature and the first edge feature.

According to an embodiment of the present disclosure, the first graph encoding sub-module further comprises: a first constructing unit, configured to construct a first Graph Laplacians based on the first edge feature. The first graph convolutional unit is configured to process the first feature by using the first graph convolutional layer based on the first Graph Laplacians to obtain the second feature, wherein the second feature comprises a plurality of first sub-features.

According to an embodiment of the present disclosure, the first predetermined network further comprises a first association layer. The first graph encoding sub-module further comprises a second constructing unit, configured to calculate an association relationship between any two of the plurality of first sub-features by using the first association layer, and determine a first relationship matrix based on the association relationship between the any two first sub-features. The second graph convolutional unit is configured to process the second feature by using the second graph convolutional layer based on the first relationship matrix to obtain the encoded first node feature.

According to an embodiment of the present disclosure, the second predetermined network comprises: a second fully connected layer, a third graph convolutional layer and a fourth graph convolutional layer. The second graph encoding sub-module comprises: a second mapping unit, configured to map the second node feature to a third feature by using the second fully connected layer, wherein a number of spatial dimensions of the third feature equals to a predetermined number; a third graph convolutional unit, configured to process the third feature by using the third graph convolutional layer to obtain a fourth feature; a fourth graph convolutional unit, configured to process the fourth feature by using the fourth graph convolutional layer to obtain the encoded second node feature; and a second encoding unit, configured to construct the encoded question graph by using the encoded second node feature and the second edge feature.

According to an embodiment of the present disclosure, the second graph encoding sub-module further comprises: a third constructing unit, configured to construct a second Graph Laplacians based on the second edge feature. The third graph convolutional unit is configured to process the third feature by using the third graph convolutional layer based on the second Graph Laplacians to obtain the fourth feature, wherein the fourth feature comprises a plurality of second sub-features.

According to an embodiment of the present disclosure, the second predetermined network further comprises a second association layer. The second graph encoding sub-module further comprises: a fourth constructing unit, configured to calculate an association relationship between any two of the plurality of second sub-features by using the second association layer, and determine a second relationship matrix based on the association relationship between the any two second sub-features. The fourth graph convolutional unit is configured to process the fourth feature by using the fourth graph convolutional layer based on the second relationship matrix to obtain the encoded second node feature.

According to an embodiment of the present disclosure, the encoded first node feature in the encoded visual graph comprises a plurality of third sub-features, and the encoded second node feature in the encoded question graph comprises a plurality of fourth sub-features. The graph matching sub-module comprises: a matching unit, configured to match the encoded first node feature and the encoded second node feature by using the graph match algorithm, to determine a matching relationship between any one of the plurality of third sub-features and any one of the plurality of fourth sub-features and determine a matching matrix based on the matching relationship between the any third sub-feature and the any fourth sub-feature; an updating unit, configured to determine a first attention weight set and a second attention weight set respectively based on an attention mechanism and the matching matrix, determine an updated second node feature based on the first attention weight set, the encoded first node feature and the encoded second node feature, determine an updated first node feature based on the second attention weight set, the encoded first node feature and the encoded second node feature, and construct the updated visual graph by using the updated first node feature and the updated first edge feature, and construct the updated question graph by using the updated second node feature and the updated second edge feature.

According to an embodiment of the present disclosure, the question feature extracting module is configured to encode the input question successively by using a predetermined word embedding algorithm and a predetermined feature embedding algorithm to obtain the question feature.

According to an embodiment of the present disclosure, the fusing module comprises: a mergence sub-module, configured to perform a concatenate mergence on the updated first node feature and the updated second node feature to obtain a merged feature; a processing sub-module, configured to perform a predetermined pooling operation on the merged feature to obtain a reasoning feature; and a fusing sub-module, configured to fuse the reasoning feature and the question feature to obtain the fused feature.

According to an embodiment of the present disclosure, the fusing sub-module is specifically configured to perform an element-wise dot product operation on the reasoning feature and the question feature to obtain the fusion feature.

According to an embodiment of the present disclosure, the predicting module is specifically configured to process the fusion feature by using a multi-layer perceptron to obtain the predicted answer for the fusion feature.

Another aspect of the present disclosure provides a computer device, comprising: a memory, processor and computer instructions stored on the memory and executable on the processor; wherein the processor, when executing the computer instructions, realizes the above-mentioned method.

Another aspect of the present disclosure provides a non-transitory computer-readable storage medium having computer instructions stored thereon that, when executed by a processor, realizes the above-mentioned method.

Another aspect of the present disclosure provides a computer program including computer-executable instructions that, when executed, perform the above-mentioned method.

BRIEF DESCRIPTION OF THE ACCOMPANYING DRAWINGS

Figure 2:
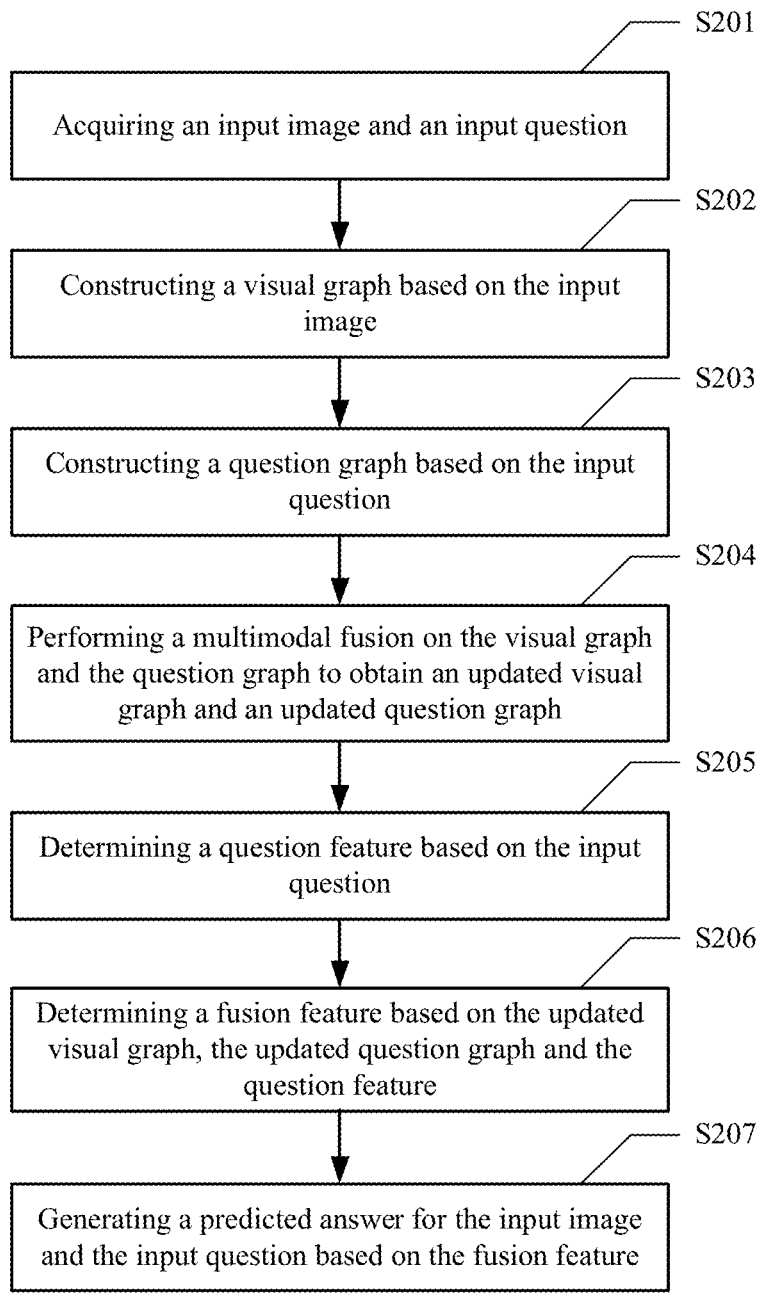
Figure 3A:
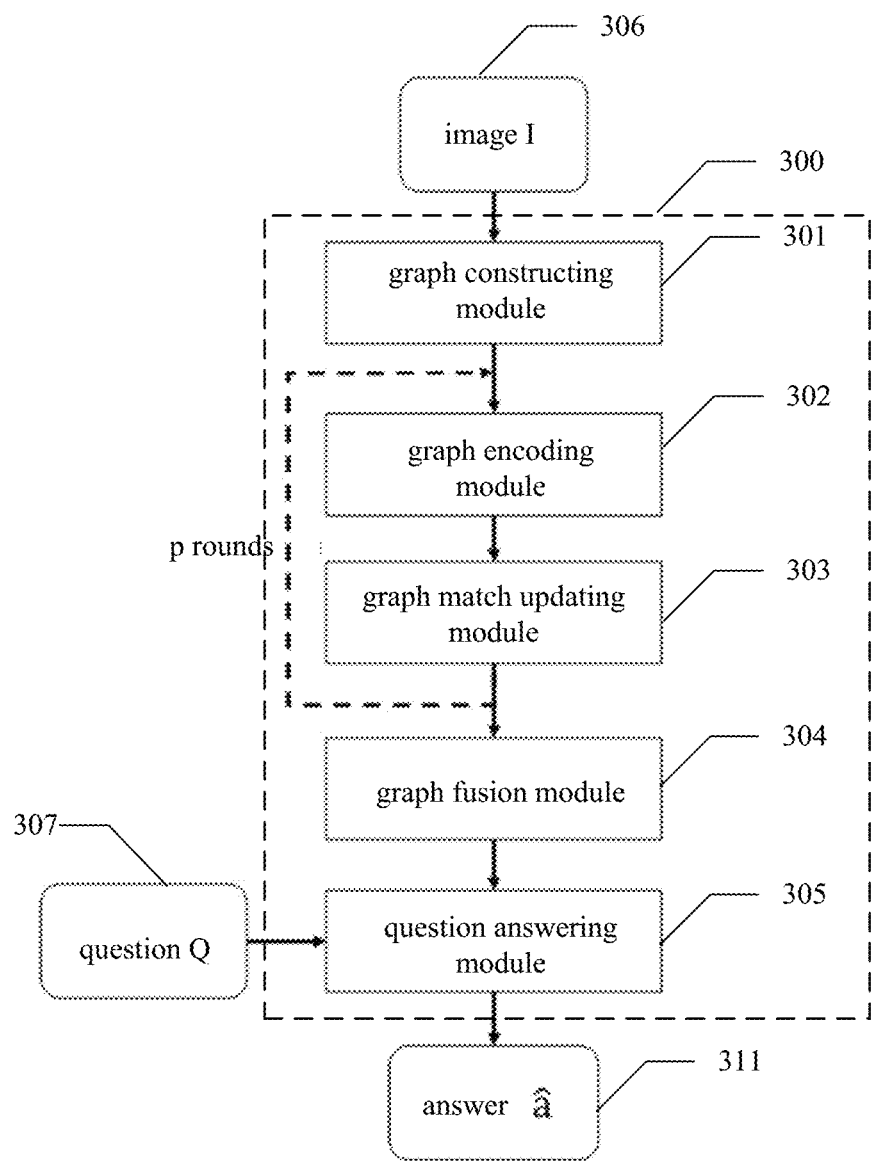
Figure 3B:
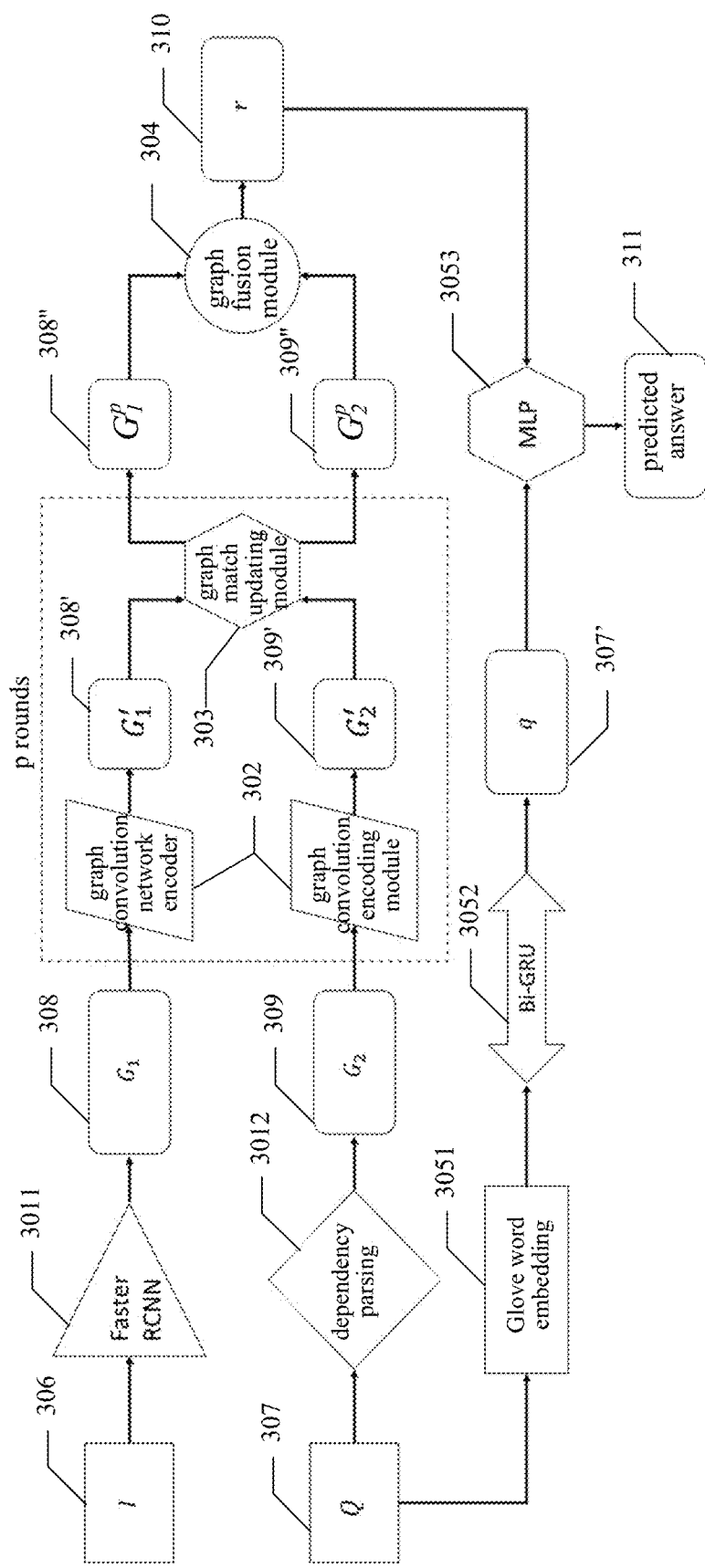
Figure 3C:
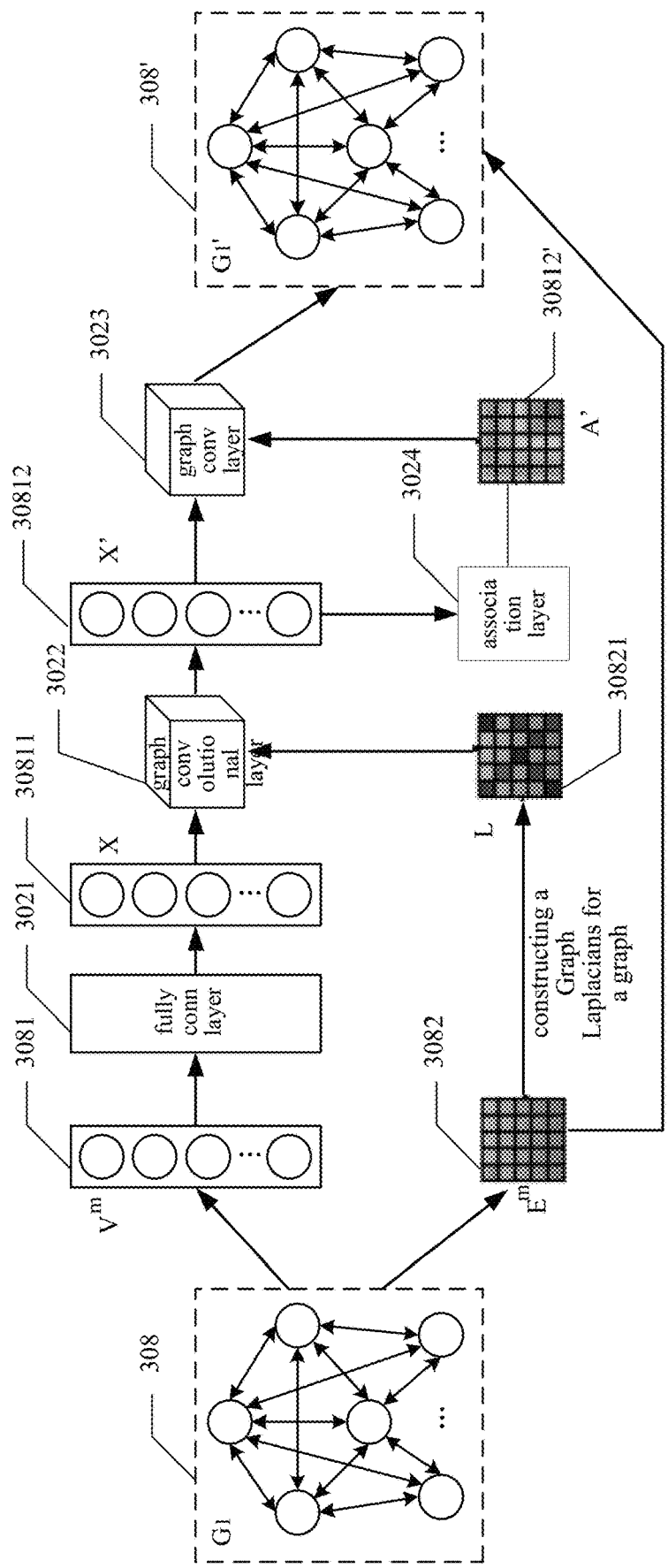
Figure 3D:
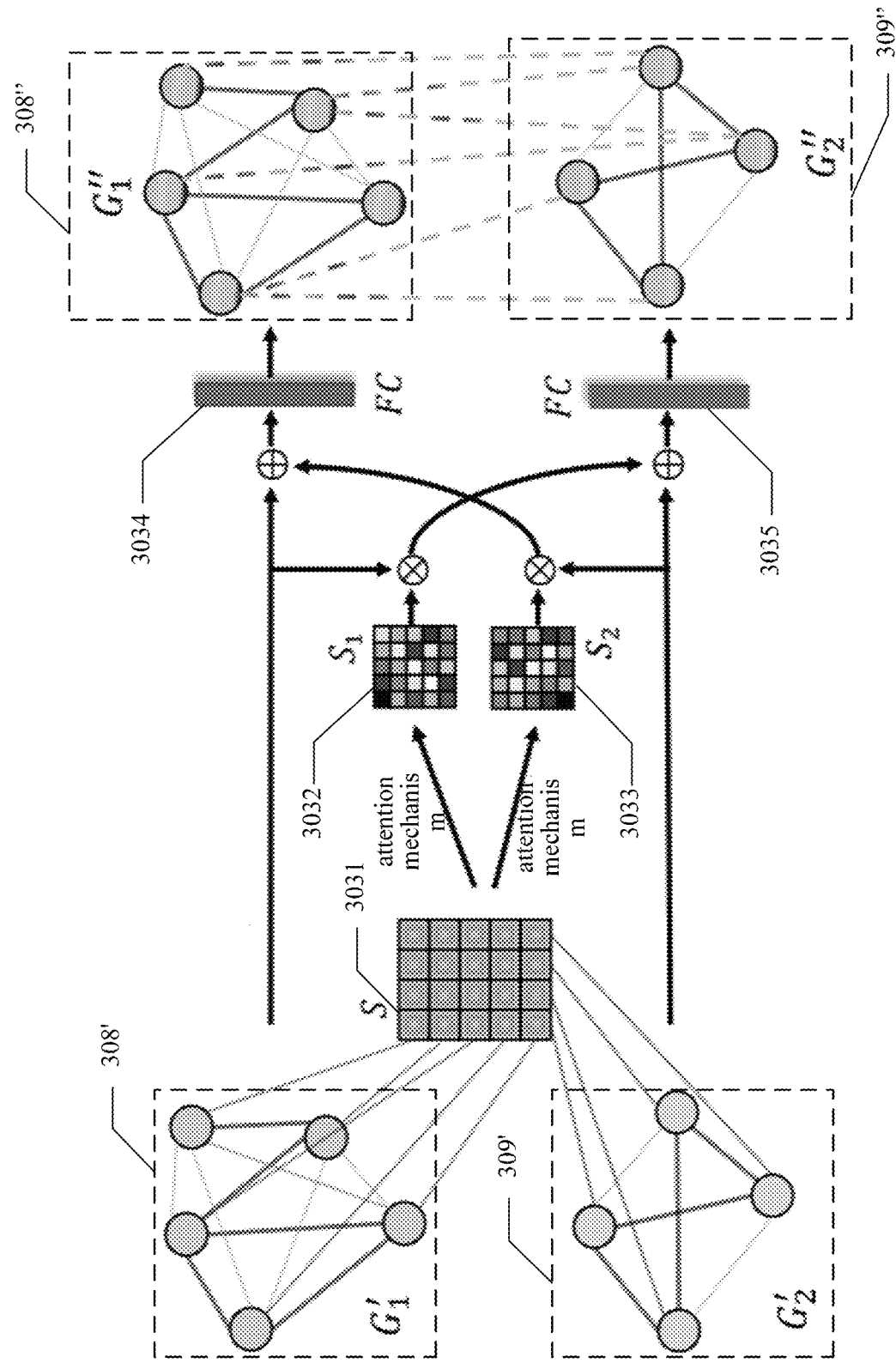
Figure 4:
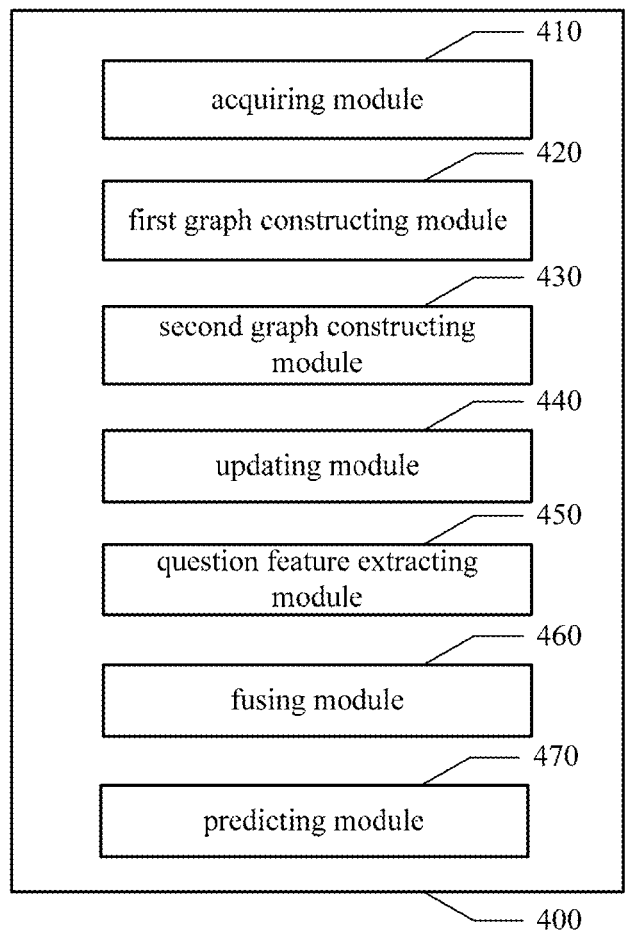
Figure 5:
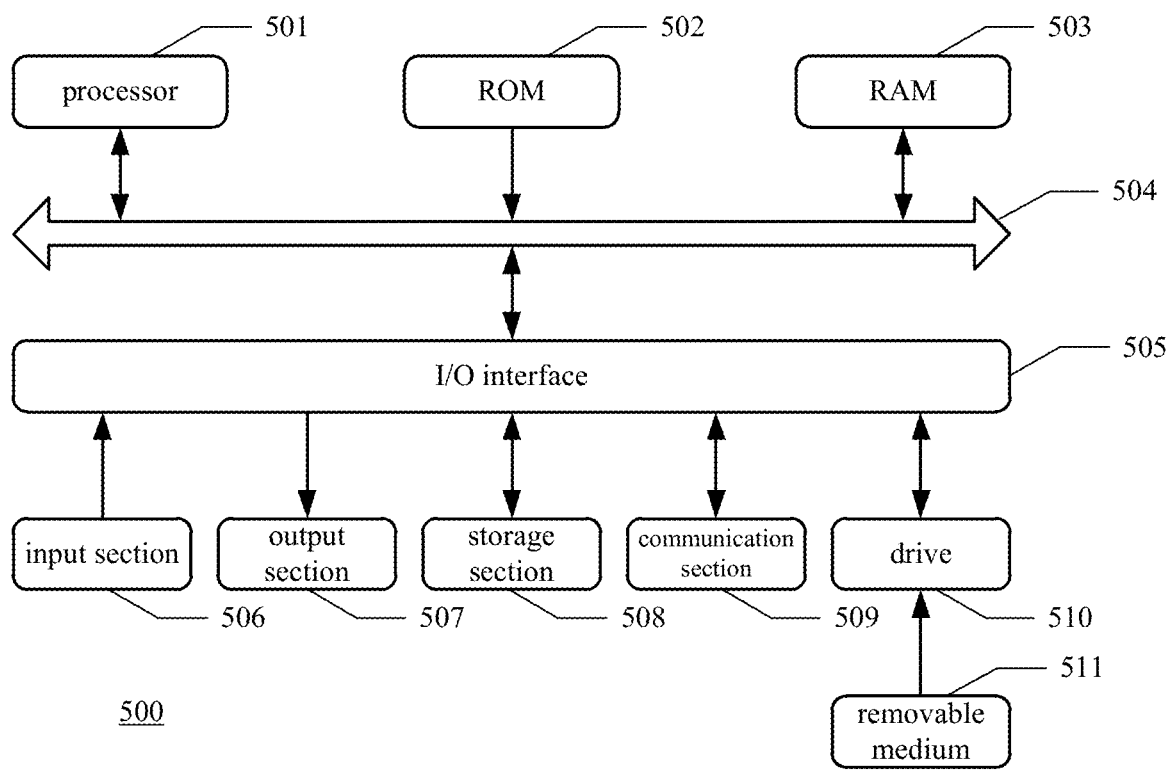

The above and other objects, features, and advantages of the present disclosure will be more apparent through the following description of embodiments of the present disclosure with reference to the accompanying drawings, in which:

FIG. 1 schematically shows an exemplary system architecture applying a method and an apparatus for visual question answering according to an embodiment of the present disclosure;

FIG. 2 schematically shows a flowchart of a method for visual question answering according to an embodiment of the present disclosure;

FIG. 3A schematically shows an exemplary diagram of a process of visual question answering according to an embodiment of the present disclosure;

FIG. 3B schematically shows an exemplary diagram of a process of visual question answering according to another embodiment of the present disclosure;

FIG. 3C schematically shows an exemplary structural diagram of a graph convolution network encoder according to an embodiment of the present disclosure;

FIG. 3D schematically shows an exemplary diagram of a processing procedure of a graph match updating module according to an embodiment of the present disclosure;

FIG. 4 schematically shows a block diagram of an apparatus for visual question answering according to an embodiment of the present disclosure; and FIG. 5 schematically shows a block diagram of a computer device according to an embodiment of the present disclosure.

DETAILED DESCRIPTION

Hereinafter, embodiments of the present disclosure will be described with reference to the accompanying drawings. It should be understood, however, that these descriptions are merely exemplarily and are not intended to limit the scope of the present disclosure. In the following detailed description, for ease of interpretation, many specific details are set forth to provide a comprehensive understanding of the embodiments of the present disclosure. However, it is clear that one or more embodiments may also be implemented without these specific details. In addition, in the following description, descriptions of well-known structures and technologies are omitted to avoid unnecessarily obscuring the concepts of the present disclosure.

The terms used herein are for the purpose of describing specific embodiments only and are not intended to limit the present disclosure. The terms "comprising", "including", etc. used herein indicate the presence of the feature, step, operation and/or part, but do not exclude the presence or addition of one or more other features, steps, operations or parts.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or too rigid way.

In the case of using the expression similar to "at least one of A, B and C", it should be explained according to the meaning of the expression generally understood by those skilled in the art (for example, "a system having at least one of A, B and C" should include but not be limited to a system having only A, a system having only B, a system having only C, a system having A and B, a system having A and C, a system having B and C, and/or a system having A, B and C). In the case of using the expression similar to "at least one of A, B and C", it should be explained according to the meaning of the expression generally understood by those skilled in the art (for example, "a system having at least one of A, B and C" should include but not be limited to a system having only A, a system having only B, a system having only C, a system having A and B, a system having A and C, a system having B and C, and/or a system having A, B and C).

The embodiments of the present disclosure provide a method and an apparatus for visual question answering, a computer device and a medium. The method for visual question answering may include processes of acquiring, first graph constructing, second graph constructing, updating, question feature extracting, fusing and predicting. In the process of acquiring, an input image and an input question are acquired. The process of first graph constructing is performed based on the input image, to construct a visual graph, and the visual graph includes a first node feature and a first edge feature. The process of second graph constructing is performed based on the input question, to construct a question graph, and the question graph may include a second node feature and a second edge feature. In the process of updating, a multimodal fusion on the visual graph and the question graph is performed, to obtain an updated visual graph and an updated question graph. The process of question feature extracting is performed based on the input question, so as to determine a question feature. In the process of fusing, a fusion feature is determined based on the updated visual graph, the updated question graph and the question feature. The process of predicting may be performed based on the fusion feature to generate a predicted answer for the input image and the input question.

At present, with a rapid development of Internet technology, more and more data types are generated. "Cross-modal" data has gradually become a main data form. Cross-modal feature alignment has become an important research direction in the fields of multimedia and deep learning, so as to bridge a semantic gap between different media (such as image, video and text) and establish a unified semantic expression. In a technology of visual question answering, cross-modal feature alignment and fusion is also a current difficulty of the research. Visual question answering is a natural language question answering for visual graphs. As a research direction of visual understanding, visual question answering connects vision and language. A model is intended to answer a specific question on basis of understanding an image. Nowadays, the system for visual question answering is widely studied in academic and industrial circles. A goal of this kind of system for visual question answering is to design a reasonable model, so that the system for visual question answering may answer accurately for any question described by natural language and any given image after full understanding and reasoning. However, there are still some difficulties to overcome in a current system for visual question answering, such as cross-modal data fusion and effective relationship reasoning.

FIG. 1 schematically shows an exemplarily system architecture 100 applying a method and apparatus for visual question answering according to an embodiment of the present disclosure. It should be noted that FIG. 1 is only an example of a system architecture in which the embodiments of the present disclosure may be applied, so as to help those skilled in the art to understand the technical content of the present disclosure. It does not mean that the embodiments of the present disclosure cannot be used for other apparatuses, systems or scenes.

As shown in FIG. 1, a system architecture 100 of this embodiment may include a plurality of terminal devices 110, a network 120, and a server 130. The terminal devices 110 may be various terminal devices, such as desktop, portable computer, smart phone, tablet computer, etc., and are not limited herein. The server 130 may be various electronic devices having certain computing ability, for example, the server 130 may be a server or a server cluster, and is not limited herein. The terminal devices 110 may be installed with software clients having various functions to interact with the server 130 by using a software client.

It may be understood that in an embodiment, the method for visual question answering according to the embodiment of the present disclosure may be performed by a terminal device 110, and accordingly, the apparatus for visual question answering may be provided in the terminal device 110. In another embodiment, the method for visual question answering according to the embodiment of the present disclosure may be performed by the server 130, and accordingly, the apparatus for visual question answering may be provided in the server 130. In another embodiment, the method for visual question answering according to the embodiment of the present disclosure may be performed by other devices capable of communicating with a terminal device 110 and/or the server 130, and accordingly, the apparatus for visual question answering may be provided in the other devices.

In recent years, visual question answering has developed rapidly, and has received extensive attention from fields of computer vision and natural language processing. Many solutions have been proposed in various fields to implement a task of visual question answering. Most of the solutions may perform an end-to-end process. For example, a pre-trained convolutional neural network is used to extract an image feature, a recurrent neural network is used to indicate a question, and the image feature and the question feature are connected to predict an answer. At present, the following three models are widely used in a project for visual question answering: (1) a coarse-grained cross-modal representing model for visual question answering; (2) a fine-grained cross-modal representing model for visual question answering based on an attention mechanism; and (3) a model for visual question answering based on external knowledge or knowledge network.

Model (1) is a most direct model for visual question answering. Cross-modal feature fusing is a core of this kind of model, but when processing content that relatively complex and there being images of many subjects, more noise may inevitably be introduced, and the noise may affect accuracy of answer predicting. Processing for question text also has a same problem. When a question sentence being relatively long and there being multiple words related to an image, the model is difficult to capture a keyword expected by a questioner, thus leading to a poor accuracy of answer predicting. Model (2) is obtained by introducing an attention mechanism based on the above-mentioned coarse-grained cross-modal model, thus improving representing ability of a fine-grained cross-modal feature. However, most of attention models used in current models for visual question answering are based on a characteristic of a question to learn an interested region of an image, and ignore attention learning of the question itself, i.e., ignore attention learning of a keyword or key phrase in the question, thus resulting in poor accuracy of answer predicting. A problem of model (3)

is that an existing model being not easy to map external knowledge to all questions on a data set for visual question answering, only solving some kinds of questions, and lacking of universality.

From the above analysis, the current project for visual question answering has the following questions. First, cross-modal fusing strategy is not good when a complex fusing model being introduced, so that computing efficiency of the model is greatly reduced. Therefore, a research on how to reduce computing overhead while ensuring effective feature fusing is a key development direction in visual question answering. Second, ability of relationship reasoning is not enough. For example, in many real processes of visual question answering, a model is intended to find a final answer by using multi-step relationship reasoning. However, the current model only answers questions by using multimodal feature fusing, causing understanding and reasoning of complex questions ineffective.

According to an embodiment of the present disclosure, a method for visual question answering is provided. This method is illustrated by exemplarily drawings. It should be noted that a serial number for each operation in the following method is only used as representation of the operation for description, and should not be regarded as representing a performing order of each operation. Unless explicitly indicated, the method is not intended to be performed exactly in the shown order.

FIG. 2 schematically shows a flowchart of a method for visual question answering according to an embodiment of the present disclosure.

As shown in FIG. 2, the method may include operations S201 to S207.

In operation S201, an input image and an input question is acquired.

In operation S202, a visual graph is constructed based on the input image.

According to an embodiment of the present disclosure, the visual graph is a topological structure representation of the input image, and is used to more comprehensively and accurately represent feature information of the input image. Exemplarily, the visual graph may include a first node feature and a first edge feature. The first node feature is used to represent feature information of one or more target objects in the input image, and the first edge feature is used to represent a potential relationship between target objects in the input image.

In operation S203, a question graph is constructed based on the input question.

According to an embodiment of the present disclosure, the question graph is a topological structure representation of the input question, and is used to more comprehensively and accurately represent feature information of the input question. Exemplarily, the question graph may include a second node feature and a second edge feature. The second node feature is used to represent feature information of one or more words in the input question, and the second edge feature is used to represent a potential relationship between words in the input question.

In operation S204, a multimodal fusion is performed on the visual graph and the question graph to obtain an updated visual graph and an updated question graph.

Exemplarily, a semantic gap between image data and text data may be narrowed based on the multimodal fusion of S204, so that the obtained updated visual graph and updated question may achieve alignment and updating of two different modal features.

In operation S205, a question feature is determined based on the input question.

In operation S206, a fusion feature is determined based on the updated visual graph, the updated question graph and the question feature.

In operation S207, a predicted answer for the input image and the input question is generated based on the fusion feature.

Those skilled in the art may understand that the method for visual question answering according to the embodiments of the present disclosure, after acquiring an input image and an input question, represents feature information of a target object in the image and a potential relationship between target objects in the image by constructing a topological structure (visual graph) for the input image, and represents feature information of a word in the question and a potential relationship between words in the question by constructing a topological structure (question graph) for the input question, so as to reduce noise impact caused by multi-target images and complex questions. Furthermore, alignment and updating of the visual graph and the question graph are realized by performing a multimodal fusion on the visual graph and the question graph, to shorten a semantic gap between modalities. On this basis, a fused feature is obtained according to an updated visual graph, an updated question graph and a question feature, and a final answer is predicted based on the fused feature. Due to optimization of the feature representation of the input image in an early stage, and the multimodal fusion on the visual graph and the question graph in the process, reasoning ability of a process of visual question answering for complex input is effectively enhanced, making the process of visual question answering according to the embodiment of the present disclosure more interpretable.

With reference to FIGS. 3A to 3D, the method for visual question answering according to the embodiment of the present disclosure may be illustrated with specific embodiments.

FIG. 3A schematically shows an exemplarily diagram of a process of visual question answering according to an embodiment of the present disclosure. FIG. 3B schematically shows an exemplarily diagram of a process of visual question answering according to another embodiment of the present disclosure.

In an example shown in FIG. 3A, a network model 300 may be constructed in advance, and the network model 300 may include a graph constructing module 301, a graph encoding module 302, a graph match updating module 303, a graph fusion module 304 and a question answering module 305 connected in sequence. The graph encoding module 302 may be a graph convolution network encoder (GCN encoder) 302, the graph convolution network encoder 302 may connect in series with the graph match updating module 303 to construct an integral updating module, and the network model 300 may include one or more integral updating modules. According to an embodiment of the present disclosure, the network model 300 is intended to be trained so that the network model 300 has an ability to perform the task of visual question answering as shown in FIG. 2. In a training process, a sample image and a sample question are input into the network model 300, so that a parameter of the network model 300 may be optimized according to a difference between an output of the network model 300 and a sample label until an objective function of the network model 300 converges. The sample label is a real answer for the sample image and the sample question. Then, the training for the network model 300 is completed, so that the method for visual question answering according to an embodiment of the present disclosure may be performed by using the trained network model 300. The following is an example of the performing process.

According to an embodiment of the present disclosure, as shown in FIG. 3A, the graph constructing module 301 in the network model 300 acquires an input image I 306 and an input question Q 307. The graph constructing module 301 may be used to perform the above operation S202, constructing a visual graph based on the input image. Exemplarily, the graph constructing module 301 may process the input image I 306 by using an object detection network to extract an appearance feature and a spatial feature for a plurality of target objects in the input image from a middle layer of the object detection network, and determine the first node feature based on the appearance feature and spatial feature. The graph constructing module 301 may determine position information of each of the plurality of target objects respectively, based on a processing result output by an output layer of the object detection network, determine a position relationship between any two of the plurality of target objects based on the position information of each of the plurality of target objects, and determine the first edge feature based on the position relationship between the any two target objects. Thus, the visual graph is constructed by using the first node feature and the first edge feature.

In an example shown in FIG. 3B, the graph constructing module 301 detects $K_1$ target objects in the input image I 306 by using a Faster RCNN (Faster Region Convolutional Neural Network) 3011, and extracts an appearance feature $F \in \mathbb{R}^{K_1*2048}$ and a spatial feature $S \in \mathbb{R}^{K_1*4}$ of the target objects after ROI Pooling on the whole feature map. The appearance feature F may include $K_1$ sub-features for $K_1$ target objects, each sub-feature may be represented as a vector having 2048 spatial dimensions, the number of spatial dimensions may be set according to demand, and here is just an example. And the spatial feature S may further include $K_1$ sub-features for $K_1$ target objects, and each sub-feature may be represented as a vector having 4 spatial dimensions, for example including a height value, a width value and a center point coordinate for a bounding box of the target object. Thus, the appearance feature F and the spatial feature S are combined as a first node feature $V^m=\{F\|S\}$ of the visual graph $G_1$ 308, and the combining manner may be connection combining.

The first edge feature of the visual graph $G_1$ 308 may be a binary representation $E^m=\{0,1\}^{K_1*K_1}$. The first edge feature may be determined based on a position relationship between any two target objects in the input image 1306. According to an embodiment of the present disclosure, the any two target objects may include different target objects or a same target object. Through the processing of the above object detection network, a position coordinate for each target object in the input image I 306 may be obtained, and a position region for each target object may be determined.

Exemplarily, a value of each element in the first edge feature $E^m$ may be determined by determining whether an Intersection-over-Union (IoU) between position regions of any two target objects is greater than a predetermined threshold. For example, setting the predetermined threshold value to 0.3, for an i-th target object and a j-th target object in the input image, an IoU value between position regions of the i-th target object and the j-th target object is calculated. In response to the IoU value being greater than the predetermined threshold, an element $e_{ij}$ in the first edge feature $E^m$ is indicated as 1; and in response to the IoU value being less than or equal to the predetermined threshold, the element $e_{ij}$ in the first edge feature $E^m$ is indicated as 0. In the embodiment, i and j are both positive integers greater than or equal to 1 and less than or equal to $K_1$, and i and j may be the same or different.

According to the above exemplarily embodiment, a visual diagram $G_1=\{V^m,E^m\}$ may be constructed.

According to an embodiment of the present disclosure, as shown in FIG. 3A, the graph constructing module 301 in the network model 300 further acquires an input question Q 307. The graph constructing module 301 may further be used to perform the above-mentioned operation S203, constructing a question graph based on the input question. Exemplarily, the graph constructing module 301 may set each word in the input question Q as a word node, so as to process the input question successively by using a word embedding algorithm and a feature embedding algorithm to extract a plurality of word node features (for example, $K_2$ word node features in total) from the input question Q, wherein the plurality of word node features are used to indicate feature information of each of a plurality of words in the input question Q. Furthermore, a dependency relationship between any two of the plurality of words is determined by using a dependency parsing algorithm 3012, and a second edge feature $E^n=\{0,1\}^{K_2*K_2}$ is determined based on the dependency relationship between the any two words. Therefore, a second node feature $V^n \in \mathbb{R}^{K_2*2048}$ is constructed by using the plurality of word node features, and the question graph $G_2$ 309 is constructed by using the second node feature $V^n$ and the second edge feature $E^n$.

According to the above exemplarily embodiment, a visual diagram $G_2=\{V^n,E^n\}$ may be constructed.

According to an embodiment of the present disclosure, a process of performing a multimodal fusion on the visual graph and the question graph in operation S204 may include: performing at least one round of multimodal fusion operation. Each of the at least one round of multimodal fusion operation may include the following operations. The graph convolution network encoder 302 encodes the first node feature by using a first predetermined network based on the first node feature and the first edge feature, to obtain an encoded visual graph. Furthermore, the graph convolution network encoder 302 encodes the second node feature by using a second predetermined network based on the second node feature and the second edge feature, to obtain an encoded question graph. Then, the graph match updating module 303 performs a multimodal fusion on the encoded visual graph and the encoded question graph by using a graph match algorithm, to obtain the updated visual graph and the updated question graph.

As shown in FIG. 3B, the visual graph $G_1$ 308 is input into the first predetermined network, and the question graph $G_2$ 309 is input into the second predetermined network. In the embodiment, both the first predetermined network and the second predetermined network may be a graph convolution network encoder 302. The graph convolution network encoder 302 is used to update node features of different graphs (visual graph and question graph) and learn an internal relationship of each graph respectively based on a graph convolution network (GCN) based method. For the graph convolution network encoder 302, since a principle of an encoding process for the visual graph is the same as a principle of an encoding process for the question graph, an encoding process of the graph convolution network encoder 302 for the visual graph $G_1$ 308 is described below as an example.

FIG. 3C schematically shows an exemplarily structural diagram of a graph convolution network encoder according to an embodiment of the present disclosure. As shown in FIG. 3C, the graph convolution network encoder 302 as the first predetermined network may include a first fully connected layer (FC) 3021, a first graph convolutional layer (Gconv$_1$) 3022 and a second graph convolutional layer (Gconv$_2$) 3023. Exemplarily, the above-mentioned encoding process for the visual graph G$_1$ 308 includes the following operations. The first node feature V$^m$ 3081 of the Visual Graph G$_1$ 308 is mapped to a first feature X 30811 by using the first fully connected layer 3021, wherein a number of spatial dimensions of the first feature equals to a predetermined number d. Next, the first feature X 30811 is processed by using the first graph convolutional layer 3022 to obtain a second feature X' 30812. And then, the second feature X' 30812 is processed by using the second graph convolutional layer 3023 to obtain the encoded first node feature X". Thus, the encoded visual graph G$_1$' 308' is constructed by using the encoded first node feature X" and the first edge feature E$^m$ 3082.

For example, the process of mapping the first node feature V$^m$ 3081 of the visual graph G$_1$ 308 to the first feature X 30811 by using the first fully connected layer 3021, wherein a number of spatial dimensions of the first feature equals to a predetermined number d may be represented as Formula (1).

$$X=\sigma(W_1*V) \quad \text{Formula (1)}$$

Wherein, $\sigma$ is a nonlinear function and W$_1$ is a weight parameter of the fully connected layer.

According to an embodiment of the present disclosure, a node feature may be updated and an explicit relationship may be learned by using the first graph convolutional layer 3022 according to the first edge feature E$^m$ 3082 of the visual graph G$_1$ 308. As shown in FIG. 3C, the encoding the first node feature may further include: constructing a first Graph Laplacians L 30821 based on the first edge feature E$^m$ 3082. And the process of processing the first feature X 30811 by using the first graph convolutional layer 3022 may include: processing the first feature X 30811 by using the first graph convolutional layer 3022 based on the first Graph Laplacians L 30821 to obtain the second feature X' 30812. The second feature X' 30812 includes a plurality of first sub-features x$_i$', wherein i is an integer greater than or equal to 1 and less than or equal to K$_1$, x$_i$' may be represented as a vector having d spatial dimensions. The process of calculating the second feature X' and the process of constructing the first Graph Laplacians may be shown in formulas (2) and (3) respectively.

$$X'=\sigma(W_2(X+W_3(LX))) \quad \text{Formula (2)}$$

$$L=(D)^{-1/2}E(D)^{1/2} \quad \text{Formula (3)}$$

Wherein, $D \in \mathbb{R}^{K_1*K_1}$ is a diagonal matrix, $D=\Sigma_{j \in K_1} e_{ij}$, $e_{ij} \in E$. $\sigma$ is a nonlinear function, W$_2$ and W$_3$ are weight parameters of the first graph convolutional layer.

To further learn the implicit relationship in the input image, according to an embodiment of the present disclosure, as shown in FIG. 3C, the graph convolution network encoder 302 as the first predetermined network may further include an association layer (Adj) 3024. After the processing of the first graph convolutional layer 3022 is completed, an association relationship between any two of the plurality of first sub-features x$_i$' and x$_j$' may be calculated by using the association layer 3024, thus a first relationship matrix A' 30812' may be determined based on the association relationship between the any two first sub-features.

Wherein, A'={a$_{ij}$'}, i,j ∈ {1, . . . , K$_1$}. A specific representation is shown in Formula (4).

$$a'_{ij} = \frac{\exp^{SIM(x'_i, x'_j)}}{\sum_{j \in K_1} \exp^{SIM(x'_i, x'_j)}} \quad \text{Formula (4)}$$

$$SIM(x'_i, x'_j) = \|x'_i - x'_j\|_2^2$$

As may be seen from Formula (4), this example determines an association relationship between x$_i$' and x$_j$' by calculating an L-2 distance (Euclidean distance) between x$_i$' and x$_j$'. In other examples, any method for calculating similarity may be used to determine the association relationship between x$_i$' and x$_j$', such as a cosine similarity, etc., and is not limited herein. According to the embodiment, the implicit relationship matrix between graph nodes may be learned by using the association layer.

On this basis, the second feature X' 30812 may be processed by using the second graph convolutional layer 3023. For example, a node feature at a deep level may be updated and learned by using the second graph convolutional layer 3023 according to the learned first relationship matrix A', to obtain the encoded first node feature X". The updating strategy of the second graph convolutional layer 3023 may be defined as Formula (5).

$$X''=X'+W_4(A'X') \quad \text{Formula (5)}$$

Wherein, W$_4$ is a weight parameter of the second graph convolutional layer.

According to an embodiment of the present disclosure, the graph convolution network encoder 302 as the second predetermined network may include a second fully connected layer, a third graph convolutional layer and a fourth graph convolutional layer. The above-mentioned encoding process for the second node feature V$^n$ in the question graph G$_2$ 309 may include the following operations. The second node feature V$^n$ is mapped to a third feature Y by using the second fully connected layer, and a number of spatial dimensions of the third feature equals to a predetermined number d. Next, the third feature Y is processed by using the third graph convolutional layer to obtain a fourth feature Y'. And then, the fourth feature Y' is processed by using the fourth graph convolutional layer to obtain the encoded second node feature Y". Thus, the encoded question graph G$_2$' 309' is constructed by using the encoded second node feature and the second edge feature. The principle of this process is the same as the principle of encoding the visual graph by using the graph convolution network encoder 302, and will not be repeated here.

Exemplarily, in order to learn the explicit relationship in the question graph, the encoding the second node feature V$^n$ may further include: constructing a second Graph Laplacians based on the second edge feature E$^n$. And the processing the third feature by using the third graph convolutional layer may include: processing the third feature Y by using the third graph convolutional layer based on the second Graph Laplacians to obtain the fourth feature Y', wherein the fourth feature includes a plurality of second sub-features y$_j$', wherein j is an integer greater than or equal to 1 and less than or equal to K$_2$. The principle of this process is the same as the principle of processing the visual graph by using the first graph convolutional layer, and will not be repeated here.

Further, to learn the implicit relationship in the question graph, exemplarily, the graph convolution network encoder 302 as the second predetermined network may further include a second association layer. The encoding the second node feature may further include: calculating an association relationship between any two of the plurality of second sub-features by using the second association layer, and determining a second relationship matrix based on the association relationship between the any two second sub-features. And the processing the fourth feature by using the fourth graph convolutional layer may include: processing the fourth feature by using the fourth graph convolutional layer based on the second relationship matrix to obtain the encoded second node feature. The principle of this process is the same as the principle of processing the visual graph by using the second graph convolutional layer, and will not be repeated here.

According to an embodiment of the present disclosure, since two parallel graph convolution network encoders 302 are used to encode the visual graph and the question graph respectively, after two layers of graph convolution network, the output of the graph convolution network encoder 302 as the first predetermined network is an encoded visual graph $G_1' = \{X'', E'''\}$, and the output of the graph convolution network encoder 302 as the second predetermined network is an encoded question graph $G_2' = \{Y'', E''\}$. The encoded first node feature $X''$ includes a plurality of third sub-features $x_i''$, wherein i is an integer greater than or equal to 1 and less than or equal to $K_1$. The encoded second node feature $Y''$ includes a plurality of fourth sub-features $y_j''$, wherein j is an integer greater than or equal to 1 and less than or equal to $K_2$.

As shown in FIGS. 3B and 3C, the method for visual question answering according to the embodiment of the present disclosure encodes the visual graph and the question graph respectively by using two parallel graph convolution network encoders. In the two parallel graph convolution network encoders, the first convolutional layer for processing the visual graph and the second convolutional layer for processing the question graph are weight-sharing, and the second convolutional layer for processing the visual graph and the fourth convolutional layer for processing the question graph are weight-sharing. The weight-sharing refers to updating two graphs by using a same convolutional layer in a training process. The weight parameters and updating of the convolutional layer are consistent.

With reference to FIGS. 3A and 3B, after the introduction of the graph convolution network encoder 302, an implementation based on the graph match updating module 303 is illustrated by an example. After the graph convolution network encoder, each node feature in the visual graph is fused with a feature of a related node according to the learned relationship, and each node feature in the question graph is fused with a feature of a related node according to the learned relationship, including a deep semantic feature to a certain extent. Then, the graph match updating module 303 is intended to be used to match two nodes in different graphs, to align features in two different modalities, shorten a semantic gap between modalities, and realize effective cross-modal feature fusion.

FIG. 3D schematically shows an exemplarily diagram of a processing procedure of a graph match updating module according to an embodiment of the present disclosure.

As shown in FIG. 3D, according to an embodiment of the present disclosure, the graph match updating module 303 performing the multimodal fusion on the encoded visual graph and the encoded question graph by using the graph match algorithm may include: matching the encoded first node feature and the encoded second node feature by using the graph match algorithm, to determine a matching relationship between any one of the plurality of third sub-features $x_i''$ and any one of the plurality of fourth sub-features $y_j''$, thereby determining a matching matrix S 3031, $S = \{s_{ij}\}^{K_1 * K_2}$ based on the matching relationship between the any third sub-feature $x_i''$ and the any fourth sub-feature $y_j''$. The operation may be expressed as Formula (6).

$$s_{ij} = f_a(x_i'', y_j''), \{i \in K_1, j \in K_2\} \qquad \text{Formula (6)}$$

Wherein, $x_i'' \in X''$, $y_j'' \in Y''$, $K_1$ and $K_2$ respectively represent a number of nodes of two graphs (encoded visual graph and encoded question graph) to be matched. $f_a$ can be set as a bilinear mapping, for example, $f_a$ may be represented as Formula (7).

$$s_{ij} = \exp\left(\frac{x_i'' \hat{A}(y_j'')^T}{\tau}\right) = \exp\left(\frac{x_i''(A + A^T)(y_j'')^T}{2\tau}\right), \qquad \text{Formula (7)}$$

$$\forall i \in K_1, x_i'' \in \mathbb{R}^{1 \times d}, \forall j \in K_2, y_i'' \in \mathbb{R}^{1 \times d}$$

Wherein, $A \in \mathbb{R}^{d*d}$ is a learnable matrix parameter, and z is a hyper parameter of a numerical problem.

After the process of graph match, a matching matrix $S = \{s_{ij}\}^{K_1 * K_2}$ between two graph nodes may be obtained. Thus, based on an attention mechanism and the matching matrix S, a first attention weight set $S_1$ 3032 and a second attention weight set $S_2$ 3033 are determined respectively.

Exemplarily, as shown in FIG. 3D, $S_1$ and $S_2$ are attention maps in a visual graph feature dimension and in a question graph feature dimension respectively obtained by performing softmax operations on the matching matrix S in different dimensions. For example, a softmax operation is performed on a 1-$K_1$ dimension of the matching matrix S to obtain $S_1$, and a softmax operation is performed on a 1-$K_2$ dimension of the matching matrix S to obtain $S_2$.

Then, an updated second node feature $V'''$ is determined based on the first attention weight set $S_1$, the encoded first node feature $X''$ and the encoded second node feature $Y''$; and an updated first node feature $Wm$ is determined based on the second attention weight set $S_2$, the encoded first node feature $X''$ and the encoded second node feature $Y''$. Thus, the updated visual graph $G_1''$ 308'', $G_1'' = \{V''', E'''\}$ is constructed by using the updated first node feature $V'''$ and the updated first edge feature $E'''$, and the updated question graph $G_2''$ 309'', $G_2'' = \{V''', E''\}$ is constructed by using the updated second node feature $V'''$ and the updated second edge feature $E''$.

In the example shown in FIG. 3D, $S_1$ and $S_2$ are respectively used to update node features of the two graphs, and a specific updating strategy may be as shown in Formula (8).

$$V^{m'} = W_5((S_1 \beta X'') \beta Y'')$$

$$V^{m'} = W_5((S_2 \beta Y'') \beta X'') \qquad \text{Formula (8)}$$

Wherein, $V^{m'}$ and $V^{m'}$ are node features of the two updated graphs, so that two new graph representations $G_1'' = \{V''', E'''\}$ and $G_2'' = \{V''', E''\}$ output by the graph match updating module may be obtained. In this example, the graph match updating module 303 further includes a third fully connected layer 3034 and a fourth fully connected layer 3035. $W_s$ in Formula (8) is a weight parameter of the third fully connected layer 3034 and the fourth fully connected layer 3035.

In order to achieve better updating effect, according to an embodiment of the present disclosure, the graph convolution network encoder 302 may connect in series with the graph match updating module 303 to construct an integral updating module, and a plurality of integral updating modules may connect in series in the pre-constructed network model to realize a plurality of rounds of updating for a node feature of a graph, so as to learn a deeper semantic relationship. For example, by using p integral updating modules, p rounds of updating may be realized to obtain an updated visual graph $G_1^p$ 308" and an updated question graph $G_2^p$ 309", wherein p is a positive integer.

According to an embodiment of the present disclosure, the operation S206 determining a fusion feature based on the updated visual graph, the updated question graph and the question feature may further include the following operations. The graph fusion module 304 may perform a concatenate mergence on the updated first node feature and the updated second node feature to obtain a merged feature and perform a predetermined pooling operation on the merged feature to obtain a reasoning feature. Then, the question answering module 305 may fuse the reasoning feature and the question feature to obtain the fused feature. Before performing the fusion operation, the question answering module 305 may acquire the input question Q 307 and perform the operation S205 determining the question feature based on the input question.

Exemplarily, after the graph match updating module 303, the embodiment of the present disclosure may design a new graph fusion module 304 for the fusion of two graphs to obtain a reasoning feature finally used for question reasoning. For example, first, node features of two graphs are simply concatenated and merged, and then a reasoning feature r 310, $r \in \mathbb{R}^{1*2d}$ is obtained by using an operation such as maxpool. A specific fusion manner can be shown as Formula (9).

$$R = V^m \| V^m$$

$$r = \text{Maxpool}(R) \quad \quad \text{Formula (9)}$$

Next, as shown in FIG. 3B, the question answering module 305 may be used to finally reason the question and predict the answer. For example, each word of the input question Q 307 is encoded by Glove word embedding 3051 and Bi-GRU feature embedding 3052 to obtain the question feature q 307' of the whole input question, wherein $q \in \mathbb{R}^{1*2048}$ in this example, and the reasoning feature r 310 output by the graph fusion module 305 is obtain, wherein $r \in \mathbb{R}^{1*2048}$ in this example. Thus, an element-wise dot product operation is performed on the reasoning feature r and the question feature q to fuse the reasoning feature r and the question feature q. After that, the fusion result is transmitted to MLP 3053 to predict a final answer â 311. In this example, a two-layer MLP is used, and the processing process may be shown as Formula (10).

$$â = \max(\sigma(MLP(q \circ r))) \quad \quad \text{Formula (10)}$$

It may be understood that when using a trained network model 300, an input image and an input question to be predicted are input into the network model 300, to output a corresponding answer category and a confidence level by the network model 300, so that an answer category having a highest confidence level is used as the predicted answer for the input image and the input question to be predicted. The above processing process for the input image and the input question is similar to a processing process for a sample image and a sample question in a training stage, and will not be repeated here.

According to the embodiments described above, the method for visual question answering according to an embodiment of the present disclosure learns attention in different modalities by constructing a visual graph and a question graph, thereby reducing noise impact caused by multi-target images and complex questions. Moreover, a graph encoding module based on graph convolution network is designed to effectively learn explicit and implicit relationships in various modalities, and a graph match updating module is designed to align and update features in two different modalities, thereby shortening a semantic gap between modalities and making the cross-modal feature fusion more effective. The present disclosure further realizes a multi-step reasoning by connecting the graph encoding module and the graph match updating module in series and repeatedly.

FIG. 4 schematically shows a block diagram of an apparatus for visual question answering according to an embodiment of the present disclosure.

As shown in FIG. 4, the apparatus for visual question answering 400 may include an acquiring module 410, a first graph constructing module 420, a second graph constructing module 430, an updating module 440, a question feature extracting module 450, a fusing module 460 and a predicting module 470.

The acquiring module 410 is configured to acquire an input image and an input question.

The first graph constructing module 420 is configured to construct a visual graph based on the input image, and the visual graph includes a first node feature and a first edge feature.

The second graph constructing module 430 is configured to construct a question graph based on the input question, and the question graph includes a second node feature and a second edge feature.

The updating module 440 is configured to perform a multimodal fusion on the visual graph and the question graph to obtain an updated visual graph and an updated question graph.

The question feature extracting module 450 is configured to determine a question feature based on the input question.

The fusing module 460 is configured to determine a fusion feature based on the updated visual graph, the updated question graph and the question feature.

The predicting module 470 is configured to generate a predicted answer for the input image and the input question based on the fusion feature.

It should be noted that the implementation mode, solved technical questions, realized functions and achieved technical effects of each module/unit/sub unit in the embodiment of the device part are respectively the same as or similar to the implementation mode, solved technical questions, realized functions and achieved technical effects of each corresponding step in the embodiment of the method part, and will not be repeated here.

Any multiple of the modules, sub modules, units and sub units according to the embodiments of the present disclosure, or at least part of the functions of any number of them may be implemented in one module. Any one or more of the modules, sub modules, units and sub units according to the embodiments of the present disclosure may be split into multiple modules for implementation. Any one or more of the modules, sub modules, units and sub units according to the embodiments of the present disclosure may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, one or more of the modules, sub modules, units and sub units according to the embodiments of the present disclosure may be at least partially implemented as a computer program module that, when executed, performs the corresponding functions.

For example, any multiple of the acquiring module 410, the first graph constructing module 420, the second graph constructing module 430, the updating module 440, the question feature extracting module 450, the fusing module 460 and the predicting module 470 may be integrated into one module for implementation, or any one of them may be split into multiple modules. Alternatively, at least part of the functions of one or more of these modules may be combined with at least part of the functions of other modules and implemented in one module. According to the embodiments of the present disclosure, at least one of the acquiring module 410, the first graph constructing module 420, the second graph constructing module 430, the updating module 440, the question feature extracting module 450, the fusing module 460 and the predicting module 470 may be may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, at least one of the acquiring module 410, the first graph constructing module 420, the second graph constructing module 430, the updating module 440, the question feature extracting module 450, the fusing module 460 and the predicting module 470 may be at least partially implemented as a computer program module that, when executed, performs the corresponding functions.

FIG. 5 schematically shows a block diagram of a computer device according to an embodiment of the present disclosure. The computer device shown in FIG. 5 is only an example and should not bring any limitation to the function and scope of use of the embodiments of the present disclosure.

As shown in FIG. 5, a computer device 500 according to the embodiment of the present disclosure includes a processor 501, which may execute various appropriate actions and processing according to the program stored in a read only memory (ROM) 502 or the program loaded into a random access memory (RAM) 503 from a storage section 508. The processor 501 may, for example, include a general-purpose microprocessor (for example, CPU), an instruction set processor and/or a related chipset and/or a special-purpose microprocessor (for example, an application specific integrated circuit (ASIC)), and the like. The processor 501 may also include an on-board memory for caching purposes. The processor 501 may include a single processing unit or multiple processing units for executing different actions of the method flow according to the embodiments of the present disclosure.

Various programs and data required for the operation of the device 500 are stored in the RAM 503. The processor 501, the ROM 502 and the RAM 503 are connected to each other through a bus 504. The processor 501 executes various operations of the method flow according to the embodiments of the present disclosure by executing the programs in the ROM 502 and/or the RAM 503. It should be noted that the program may also be stored in one or more memories other than the ROM 502 and the RAM 503. The processor 501 may also execute various operations of the method flow according to the embodiments of the present disclosure by executing the programs stored in the one or more memories.

According to the embodiment of the present disclosure, the device 500 may further include an input/output (I/O) interface 505 which is also connected to the bus 504. The device 500 may further include one or more of the following components connected to the I/O interface 505: an input section 506 including a keyboard, a mouse, etc.; an output section 507 including a cathode ray tube (CRT), a liquid crystal display (LCD), etc. and a speaker, etc.; a storage section 508 including a hard disk, etc.; and a communication section 509 including a network interface card such as a LAN card, a modem, and the like. The communication section 509 performs communication processing via a network such as the Internet. A drive 510 is also connected to the I/O interface 505 as required. A removable medium 511, such as a magnetic disk, an optical disk, a magneto-optical disk, a semiconductor memory, and the like, is installed on the drive 510 as required, so that the computer program read therefrom is installed into the storage section 508 as needed.

The method flow according to the embodiments of the present disclosure may be implemented as a computer software program. For example, the embodiments of the present disclosure include a computer program product including a computer program carried on a computer-readable storage medium. The computer program includes a program code for execution of the method shown in the flowchart. In such an embodiment, the computer program may be downloaded and installed from the network through the communication section 509, and/or installed from the removable medium 511. When the computer program is executed by the processor 501, the above-mentioned functions defined in the system of the embodiment of the present disclosure are performed. According to the embodiments of the present disclosure, the above-described systems, apparatuses, devices, modules, units, etc. may be implemented by computer program modules.

The present disclosure also provides a non-transitory computer-readable storage medium, which may be included in the apparatus/device/system described in the above embodiments; or exist alone without being assembled into the apparatus/device/system. The above-mentioned computer-readable storage medium carries one or more programs that when executed, perform the method according to the embodiments of the present disclosure.

According to the embodiments of the present disclosure, the non-transitory computer-readable storage medium may be a non-volatile computer-readable storage medium, for example, may include but not limited to: portable computer disk, hard disk, random access memory (RAM), read-only memory (ROM), erasable programmable read-only memory (EPROM or flash memory), portable compact disk read-only memory (CD-ROM), optical storage device, magnetic storage device, or any suitable combination of the above. In the present disclosure, the computer-readable storage medium may be any tangible medium that includes or stores programs that may be used by or in combination with an instruction execution system, apparatus, or device. For example, according to the embodiments of the present disclosure, the computer-readable storage medium may include the above-mentioned ROM 502 and/or RAM 503 and/or one or more memories other than the ROM 502 and RAM 503.

The flowcharts and block diagrams in the drawings illustrate the possible architecture, functions, and operations of the system, method, and computer program product according to various embodiments of the present disclosure. In this regard, each block in the flowcharts or block diagrams may represent a part of a module, program segment, or code, which part includes one or more executable instructions for implementing the specified logical function. It should also be noted that, in some alternative implementations, the functions noted in the blocks may also occur in a different order than that noted in the accompanying drawings. For example, two blocks shown in succession may actually be executed substantially in parallel, or they may sometimes be executed in the reverse order, depending on the functions involved. It should also be noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

The embodiments of the present disclosure have been described above. However, these embodiments are for illustrative purposes only, and are not intended to limit the scope of the present disclosure. Although the embodiments have been described separately above, this does not mean that measures in the respective embodiments cannot be used in combination advantageously. The scope of the present disclosure is defined by the appended claims and their equivalents. Without departing from the scope of the present disclosure, those skilled in the art may make various substitutions and modifications, and these substitutions and modifications should all fall within the scope of the present disclosure.

We claim:

1. A method for visual question answering, comprising:
acquiring an input image and an input question;
constructing a visual graph based on the input image, wherein the visual graph comprises a first node feature and a first edge feature;
constructing a question graph based on the input question, wherein the question graph comprises a second node feature and a second edge feature;
performing a multimodal fusion on the visual graph and the question graph to obtain an updated visual graph and an updated question graph;
determining a question feature based on the input question;
determining a fusion feature based on the updated visual graph, the updated question graph and the question feature; and
generating a predicted answer for the input image and the input question based on the fusion feature;

wherein the performing the multimodal fusion on the visual graph and the question graph comprises: performing at least one round of multimodal fusion operation, wherein each of the at least one round of multimodal fusion operation comprises:
encoding the first node feature by using a first predetermined network based on the first node feature and the first edge feature, to obtain an encoded visual graph;
encoding the second node feature by using a second predetermined network based on the second node feature and the second edge feature, to obtain an encoded question graph; and
performing a multimodal fusion on the encoded visual graph and the encoded question graph by using a graph match algorithm, to obtain the updated visual graph and the updated question graph;

wherein the first predetermined network comprises: a first fully connected layer, a first graph convolutional layer and a second graph convolutional layer, and the encoding the first node feature comprises:
mapping the first node feature to a first feature by using the first fully connected layer, wherein a number of spatial dimensions of the first feature equals to a predetermined number;
processing the first feature by using the first graph convolutional layer to obtain a second feature;
processing the second feature by using the second graph convolutional layer to obtain the encoded first node feature; and
constructing the encoded visual graph by using the encoded first node feature and the first edge feature.

2. The method of claim 1, wherein the constructing the visual graph based on the input image comprises:
processing the input image by using an object detection network to extract an appearance feature and a spatial feature of a plurality of target objects in the input image from a middle layer of the object detection network, wherein the appearance feature comprises $K_1$ sub-features for $K_1$ target objects, with each sub-feature of the appearance feature being represented as a vector having a first number of spatial dimensions, and the spatial feature comprises $K_1$ sub-features for $K_1$ target objects, with each sub-feature of the spatial feature being represented as a vector having a second number of spatial dimensions, where $K_1$ is an integer greater than one;
determining the first node feature based on the appearance feature and the spatial feature;
determining position information of each of the plurality of target objects respectively, based on a processing result output by an output layer of the object detection network;
determining a position relationship between any two of the plurality of target objects based on the position information of each of the plurality of target objects;
determining the first edge feature based on the position relationship between the any two target objects; and
constructing the visual graph by using the first node feature and the first edge feature.

3. The method of claim 2, wherein the determining the position relationship between any two of the plurality of target objects respectively, based on the position information of each of the plurality of target objects comprises:
calculating an intersection of position regions of the any two target objects and a union of the position regions of the any two target objects according to position information of each of the any two target objects;
calculating a ratio between the intersection and the union;
indicating the position relationship between the any two target objects as 1, in response to the ratio being greater than a predetermined threshold; and
indicating the position relationship between the any two target objects as 0, in response to the ratio being less than or equal to the predetermined threshold.

4. The method of claim 1, wherein the constructing the question graph based on the input question comprises:
processing the input question successively by using a word embedding algorithm and a feature embedding algorithm to extract a plurality of word node features from the input question, wherein the plurality of word node features are used to indicate feature information of each of a plurality of words in the input question;
determining a dependency relationship between any two of the plurality of words by using a dependency parsing algorithm;
determining the second edge feature based on the dependency relationship between the any two words; and
constructing the second node feature by using the plurality of word node features, and constructing the question graph by using the second node feature and the second edge feature.

5. The method of claim 1, wherein the encoding the first node feature further comprises: constructing a first Graph Laplacians based on the first edge feature; and
wherein, the processing the first feature by using the first graph convolutional layer comprises: processing the first feature by using the first graph convolutional layer based on the first Graph Laplacians to obtain the second feature, wherein the second feature comprises a plurality of first sub-features.

6. The method of claim 5, wherein the first predetermined network further comprises a first association layer;
wherein the encoding the first node feature further comprises: calculating an association relationship between any two of the plurality of first sub-features by using the first association layer, and determining a first relationship matrix based on the association relationship between the any two first sub-features; and
wherein the processing the second feature by using the second graph convolutional layer comprises: processing the second feature by using the second graph convolutional layer based on the first relationship matrix to obtain the encoded first node feature.

7. The method of claim 1, wherein the second predetermined network comprises: a second fully connected layer, a third graph convolutional layer and a fourth graph convolutional layer; and
wherein the encoding the second node feature comprises:
mapping the second node feature to a third feature by using the second fully connected layer, wherein a number of spatial dimensions of the third feature equals to a predetermined number;
processing the third feature by using the third graph convolutional layer to obtain a fourth feature;
processing the fourth feature by using the fourth graph convolutional layer to obtain the encoded second node feature; and
constructing the encoded question graph by using the encoded second node feature and the second edge feature.

8. The method of claim 7, wherein the encoding the second node feature further comprises: constructing a second Graph Laplacians based on the second edge feature; and
wherein, the processing the third feature by using the third graph convolutional layer comprises: processing the third feature by using the third graph convolutional layer based on the second Graph Laplacians to obtain the fourth feature, wherein the fourth feature comprises a plurality of second sub-features.

9. The method of claim 8, wherein the second predetermined network further comprises a second association layer;
wherein the encoding the second node feature further comprises: calculating an association relationship between any two of the plurality of second sub-features by using the second association layer, and determining a second relationship matrix based on the association relationship between the any two second sub-features; and
wherein the processing the fourth feature by using the fourth graph convolutional layer comprises: processing the fourth feature by using the fourth graph convolutional layer based on the second relationship matrix to obtain the encoded second node feature.

10. The method of claim 1, wherein the encoded first node feature in the encoded visual graph comprises a plurality of third sub-features, and the encoded second node feature in the encoded question graph comprises a plurality of fourth sub-features; and
wherein the performing the multimodal fusion on the encoded visual graph and the encoded question graph by using the graph match algorithm comprises:
matching the encoded first node feature and the encoded second node feature by using the graph match algorithm, to determine a matching relationship between any one of the plurality of third sub-features and any one of the plurality of fourth sub-features;
determining a matching matrix based on the matching relationship between the any third sub-feature and the any fourth sub-feature;
determining a first attention weight set and a second attention weight set respectively based on an attention mechanism and the matching matrix;
determining an updated second node feature based on the first attention weight set, the encoded first node feature and the encoded second node feature;
determining an updated first node feature based on the second attention weight set, the encoded first node feature and the encoded second node feature; and
constructing the updated visual graph by using the updated first node feature and the updated first edge feature, and constructing the updated question graph by using the updated second node feature and the updated second edge feature.

11. The method of claim 10, wherein the determining the question feature based on the input question comprises:
encoding the input question successively by using a predetermined word embedding algorithm and a predetermined feature embedding algorithm to obtain the question feature.

12. The method of claim 10, wherein the determining the fusion feature based on the updated visual graph, the updated question graph and the question feature comprising:
performing a concatenate mergence on the updated first node feature and the updated second node feature to obtain a merged feature;

performing a predetermined pooling operation on the merged feature to obtain a reasoning feature; and fusing the reasoning feature and the question feature to obtain the fused feature.

13. The method of claim 12, wherein the fusing the reasoning feature and the question feature comprises:

performing an element-wise dot product operation on the reasoning feature and the question feature to obtain the fusion feature.

14. The method of claim 1, wherein the generating the predicted answer for the input image and the input question based on the fusion feature comprises:

processing the fusion feature by using a multi-layer perceptron to obtain the predicted answer for the fusion feature.

15. A computer device, comprising:

a memory having computer instructions stored thereon; and at least one processor;

wherein the processor, when executing the computer instructions, realizes the method of claim 1.

16. A non-transitory computer-readable storage medium having computer instructions stored thereon that, when executed by a processor, realizes the method of claim 1.

* * * * *